US011671369B2

(12) United States Patent
Rajput et al.

(10) Patent No.: US 11,671,369 B2
(45) Date of Patent: Jun. 6, 2023

(54) METHODS, SYSTEMS, AND COMPUTER READABLE MEDIA FOR GENERATING AND USING NETWORK FUNCTION (NF) SET OVERLOAD CONTROL INFORMATION (OCI) AND LOAD CONTROL INFORMATION (LCI) AT SERVICE COMMUNICATION PROXY (SCP)

(71) Applicant: Oracle International Corporation, Redwood Shores, CA (US)

(72) Inventors: Jay Rajput, Bangalore (IN); Virendra Singh, Bangalore (IN); Ankit Srivastava, Gorakhpur (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/376,095

(22) Filed: Jul. 14, 2021

(65) Prior Publication Data
US 2023/0022955 A1  Jan. 26, 2023

(51) Int. Cl.
*H04L 47/12* (2022.01)
*H04L 67/566* (2022.01)

(52) U.S. Cl.
CPC ............ *H04L 47/12* (2013.01); *H04L 67/566* (2022.05)

(58) Field of Classification Search
CPC ..... H04L 67/02; H04L 63/029; H04L 67/567; H04L 65/612; H04L 67/06; H04L 67/60;
(Continued)

(56) References Cited

U.S. PATENT DOCUMENTS 11,271,846 B2 * 3/2022 Krishan ................. H04L 45/02
2020/0053828 A1 2/2020 Bharatia et al.
(Continued)

FOREIGN PATENT DOCUMENTS

KR 20210023299 A 3/2021
WO WO-2020202043 A1 * 10/2020
(Continued)

OTHER PUBLICATIONS

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
(Continued)

*Primary Examiner* — Djenane M Bayard
(74) *Attorney, Agent, or Firm* — Jenkins, Wilson, Taylor & Hunt, P.A.

(57) ABSTRACT

A method for generating and using network function (NF) set load information, the method includes, at a service communication proxy (SCP), receiving service based interface (SBI) requests from consumer NFs. The method further includes forwarding the SBI requests to producer NF instances that are members of an NF set. The method further includes receiving responses to the SBI requests from the producer NF instances. The method further includes determining NF instance load control information (LCI) for the producer NF instances using the responses. The method further includes computing, by the SCP and from the NF instance LCI for the producer NF instances, NF set LCI for the NF set. The method further includes communicating the NF set LCI for the NF set to at least one of the consumer NFs or using the NF set LCI for the NF set to select a producer NF instance within an NF set to provide a service for one of the consumer NFs.

16 Claims, 5 Drawing Sheets

(58) Field of Classification Search
CPC ... H04L 67/56; H04L 63/0272; H04L 67/568; H04L 67/1021; H04L 67/01; H04L 67/563; H04L 12/4633; H04L 12/2856; H04L 2101/69; H04L 47/283; H04L 61/2514; H04L 61/2575; H04L 61/2589; H04L 61/4511; H04L 61/5007; H04L 69/167; H04L 69/168; H04L 12/2803; H04L 49/40; H04L 67/12; H04L 1/0002; H04L 1/0041; H04L 1/18; H04L 5/0064; H04L 67/1097; H04L 1/0009; H04L 67/306; H04L 1/1874; H04L 47/122; H04L 12/66; H04L 43/045; H04L 69/00; H04L 1/1854; H04L 1/0076; H04L 1/0057; H04L 67/565; H04L 69/163; H04L 69/164; H04L 41/0893; H04L 41/14; H04L 43/0876; H04L 12/1485; H04L 41/147; H04L 43/20; H04L 65/80; H04L 12/5692; H04L 41/0816; H04L 41/149; H04L 67/1095; H04L 12/1489; H04L 41/0806; H04L 43/16; H04L 47/822; H04L 47/823; H04L 41/0895; H04L 67/1076; H04L 67/51; H04L 41/0894; H04L 67/10; H04L 9/40; H04L 1/004; H04L 41/12; H04L 41/5025; H04L 45/308; H04L 67/562; H04L 69/28; H04L 1/0003; H04L 1/0015; H04L 12/4641; H04L 2001/0097; H04L 41/084; H04L 41/0853; H04L 43/0864; H04L 45/123; H04L 63/1416

See application file for complete search history.

(56) References Cited

U.S. PATENT DOCUMENTS

| | | | |
|---|---|---|---|
| 2020/0136911 A1 | 4/2020 | Assali et al. | |
| 2020/0267214 A1 | 8/2020 | Yang | |
| 2020/0336369 A1* | 10/2020 | Ratnasamy | H04L 41/40 |
| 2020/0367045 A1 | 11/2020 | Jeong et al. | |
| 2021/0297896 A1* | 9/2021 | Lan | H04L 69/22 |
| 2021/0306211 A1 | 9/2021 | Landais | |
| 2021/0400757 A1* | 12/2021 | Dhanani | H04W 76/27 |
| 2022/0053372 A1* | 2/2022 | Shekhar | H04L 67/1001 |
| 2022/0086218 A1* | 3/2022 | Sabella | H04L 67/141 |
| 2022/0103443 A1 | 3/2022 | Mary et al. | |
| 2023/0019209 A1 | 1/2023 | Rajput et al. | |

FOREIGN PATENT DOCUMENTS

| | | |
|---|---|---|
| WO | WO-2021/160774 A1 | 8/2021 |
| WO | WO-2023/287930 A1 | 1/2023 |

OTHER PUBLICATIONS

"3rd Generation Partnership Project; Technical Specification Group Services and System Aspects; Procedures for the 5G System (5GS); Stage 2 (Release 17)," 3GPP TS 23.502, V17.0.0, pp. 1-489 (Mar. 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-163 (Mar. 2021).

Non-Final Office Action for U.S. Appl. No. 17/376,082 (dated Aug. 3, 2022).

"5G; 5G System; Network function repository services; Stage 3" (3GPP TS 29.510, V16.5.0 Release 16), ETSI TS 129.510 V16.5.0, pp. 1-210 (Nov. 2020).

"5G, 5G System; Technical Realization of Service Based Architecture; Stage 3 (3GPP TS 29.500 version 16.4.0 Release 16)", pp. 1-82, (Nov. 2020).

Commonly-Assigned, co-pending U.S. Appl. No. 17/376,082 for "Methods, Systems and Computer Readable Media for Generating Network Function (NF) Set Load Information Aware NF Discovery Response" (Unpublished, filed Jul. 30, 2021).

Notification of Transmittal of the International Search Report and the Written Opinion of the International Searching Authority, or the Declaration for International Application No. PCT/US2022/037031 (dated Nov. 8, 2022).

"3rd Generation Partnership Project; Technical Specification Group Core Network and Terminals; Study on Load and Overload Control of 5GC Service Based Interfaces; (Release 16)," 3GPP TR 29.843, V16.0.0, pp. 1-39 (Sep. 2019).

"5G; 5G System; Technical Realization of Service Based Architecture; Stage 3 (3GPP TS 29.500 version 16.7.0 Release 16)", ETSI TS 129 500, V16.7.0, pp. 1-98 (Apr. 2021).

Final Office Action for U.S. Appl. No. 17/376,082 (dated Feb. 14, 2023).

* cited by examiner

METHODS, SYSTEMS, AND COMPUTER READABLE MEDIA FOR GENERATING AND USING NETWORK FUNCTION (NF) SET OVERLOAD CONTROL INFORMATION (OCI) AND LOAD CONTROL INFORMATION (LCI) AT SERVICE COMMUNICATION PROXY (SCP)

TECHNICAL FIELD

The subject matter described herein relates to load control and overload control in communications networks. More particularly, the subject matter described herein relates to methods, systems, and computer readable media for generating and using NF set overload control information and load control information at an SCP.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discover procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as load and overload control information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as thein direct communications model.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G communications networks is the inability to accurately and efficiently compute load control information (LCI) and overload control information (OCI) for an NF set. An NF set is a group of interchangeable NF instances of the same type, supporting the same services and the same network slice(s). An NF instance is an instance of an NF that provides a service. An example of an NF instance is an access and mobility management function (AMF) instance that provides access and mobility management service for a user equipment (UE).

The NF instances in the same NF set may be geographically distributed but have access to the same context data. According to 3GPP TS 29.500, OCI and LCI can be computed for NF instances, NF service instances, and NF sets. LCI can be used to control load on NF instances, and OCI can be used to shed load from overloaded NF instances. While an individual NF instance may be capable of computing and communicating its own LCI and OCI, individual NF instances may not have sufficient information to compute OCI and LCI for an NF set. Computing OCI and LCI for an NF set by individual NF instances that are members of the NF set would require communication of NF instance OCI and LCI between all producer NF instances that are members of the NF set. Such inter-NF-instance communication could result in network congestion and unnecessary and duplicate processing by the producer NFs.

Accordingly, in light of these and other difficulties, there exists a need for improved NF set OCI and LCI generation and use.

SUMMARY

A method for generating and using network function (NF) set load information includes, at a service communication proxy (SCP), receiving service based interface (SBI) requests from consumer NFs. The method further includes forwarding the SBI requests to producer NF instances that are members of an NF set. The method further includes receiving responses to the SBI requests from the producer NF instances. The method further includes determining NF instance load control information (LCI) for the producer NF instances using the responses. The method further includes computing, by the SCP and from the NF instance LCI for the producer NF instances, NF set LCI for the NF set. The method further includes communicating the NF set LCI for the NF set to at least one of the consumer NFs or using the NF set LCI for the NF set to select a producer NF instance within an NF set to provide a service for one of the consumer NFs.

According to another aspect of the subject matter described herein, determining the NF instance LCI for the producer NF instances from the responses includes reading NF instance LCI values from 3gpp-Sbi-Lci headers of the responses.

According to another aspect of the subject matter described herein, determining the NF instance LCI for the producer NF instances from the responses includes computing the NF instance LCI for at least some of the producer NF instances from message rates of the producer NF instances and message handling capacities of the producer NF instances configured at the SCP.

According to another aspect of the subject matter described herein, computing the NF set LCI for the NF set includes generating a sum using the LCI instance determined for the producer NF instances.

According to another aspect of the subject matter described herein, generating the sum includes adding normalized loads of the producer NF instances in the NF set using the following expression:

$$\text{Load}(\text{nfSet}) = \Sigma \text{Normalized Loads of all } NF \text{ Instances in } NF \text{ Set,}$$

where Load(nfSet) is the NF set LCI for the NF set and ΣNormalized Loads of all NF Instances in NF Set is a sum of normalized loads of all of the producer NF instances in the NF set.

According to another aspect of the subject matter described herein, the method for generating and using producer NF set load information includes computing the normalized loads of the producer NF instances using the following expression:

$$\text{Normalized Load of } NF_n = \frac{\text{Load}_n * \text{Capacity}_n}{\sum \text{Capacities of all } NF \text{ instances in the } NF \text{ set}}$$

where $NF_n$ is the nth producer NF instance whose normalized load is being calculated, n being an integer, $\text{Load}_n$ is the NF instance LCI determined for producer NF instance $NF_n$ and $\text{Capacity}_n$ is a processing capacity of the producer NF instance $NF_n$ obtained from an NF profile of the producer NF instance $NF_n$.

According to another aspect of the subject matter described herein, the method for generating and using the producer NF load information includes determining, by the SCP, an NF set overload reduction metric using the NF set LCI for the NF set.

According to another aspect of the subject matter described herein, determining the NF set overload reduction metric includes storing, in memory of the SCP, an NF set overload reduction metric database including a plurality of NF set load threshold values and corresponding overload reduction metric values, performing a lookup in the NF set overload reduction metric database using the NF set LCI for the NF set to locate a highest NF set load threshold value exceeded by the NF set LCI for the NF set, and reading, from the NF set overload reduction metric database, an NF set overload reduction metric corresponding to the highest NF set load threshold value exceeded by the NF set LCI for the NF set.

According to another aspect of the subject matter described herein, the method for generating and using producer NF set load information includes communicating, by the SCP, the NF set overload reduction metric to at least one of the consumer NFs.

According to another aspect of the subject matter described herein, the method for generating and using producer NF set load information includes, using, by the SCP, the NF set overload reduction metric to reduce load on the NF set.

According to another aspect of the subject matter described herein, a system for generating and using network function (NF) set load information is provided. The system includes a service communication proxy (SCP) including at least one processor for receiving service based interface (SBI) requests from consumer NFs and forwarding the SBI requests to producer NF instances that are members of an NF set. The system further includes an NF set load information generator implemented by the at least one processor for receiving responses to the SBI requests from the producer NF instances, determining NF instance load control information (LCI) for the producer NF instances using the responses, computing, using the NF instance LCI for the producer NF instances, NF set LCI for the NF set; and communicating the NF set LCI for the NF set to at least one of the consumer NFs or using the NF set LCI for the NF set to select a producer NF instance within an NF set to provide a service for one of the consumer NFs.

According to another aspect of the subject matter described herein, the NF set load information generator is configured to determine the NF instance LCI for the producer NF instances by reading NF instance LCI values from 3gpp-Sbi-Lci headers of the responses.

According to another aspect of the subject matter described herein, the NF set load information generator is configured to determine the NF instance LCI for the producer NF instances by computing the NF instance LCI for at least some of the producer NF instances from message rates of the producer NF instances and message handling capacities of the producer NF instances configured at the SCP.

According to another aspect of the subject matter described herein, the NF set load information generator is configured to compute the NF set LCI for the NF set by generating a sum using the NF instance LCI received from the producer NF instances.

According to another aspect of the subject matter described herein, the NF set load information generator is configured to generate the sum by adding normalized loads of the producer NF instances in the NF set using the following expression:

$$\text{Load}(\text{nfSet}) = \Sigma \text{Normalized Loads of all } NF \text{ Instances in } NF \text{ Set,}$$

where Load(nfSet) is the NF set LCI for the NF set and ΣNormalized Loads of all NF Instances in NF set is a sum of normalized loads of all of the producer NF instances in the NF set.

According to another aspect of the subject matter described herein, the NF set load information generator is configured to compute the normalized loads of the producer NF instances using the following expression:

$$\text{Normalized Load of } NF_n = \frac{\text{Load}_n * \text{Capacity}_n}{\sum \text{Capacities of all } NF \text{ instances in the } NF \text{ set}}$$

where $NF_n$ is the nth producer NF instance whose normalized load is being calculated, n being an integer, $\text{Load}_n$ is the NF instance LCI determined for producer NF instance $NF_n$ and $\text{Capacity}_n$ is a processing capacity of the producer NF instance $NF_n$.

According to another aspect of the subject matter described herein, the NF set load information generator is configured to determine an NF set overload reduction metric based on the NF set LCI.

According to another aspect of the subject matter described herein, the NF set load information generator is configured to determine the NF set overload reduction metric by: storing, in memory of the SCP, an NF set overload reduction metric database including a plurality of NF set load threshold values and corresponding overload reduction metric values; performing a lookup in the NF set overload reduction metric database using the NF set LCI for the NF set to locate a highest NF set load threshold value exceeded by the NF set LCI for the NF set; and reading, from the NF set overload reduction metric database, an overload reduction metric corresponding to the highest NF set load threshold value exceeded by the NF set LCI for the NF set.

According to another aspect of the subject matter described herein, the NF set load information generator is configured to communicate the NF set overload reduction metric to at least one of the consumer NFs or use the NF set overload reduction metric to reduce load on the NF set.

According to another aspect of the subject matter described herein, a non-transitory computer readable medium having stored thereon executable instructions that when executed by a processor of a computer control the computer to perform steps is provided. The steps are performed at a service communication proxy (SCP). The steps include receiving service based interface (SBI) requests from consumer network functions (NFs). The steps further include forwarding the SBI requests to producer NF instances that are members of an NF set. The steps further include receiving responses to the SBI requests from the producer NF instances. The steps further include determining NF instance LCI for the producer NF instances using the responses. The steps further include computing, by the SCP and from the NF instance LCI for the producer NF instances, NF set LCI for the NF set. The steps further include communicating the NF set LCI for the NF set to at least one of the consumer NFs or using the NF set LCI for the NF set to select a producer NF instance within an NF set to provide a service for one of the consumer NFs.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
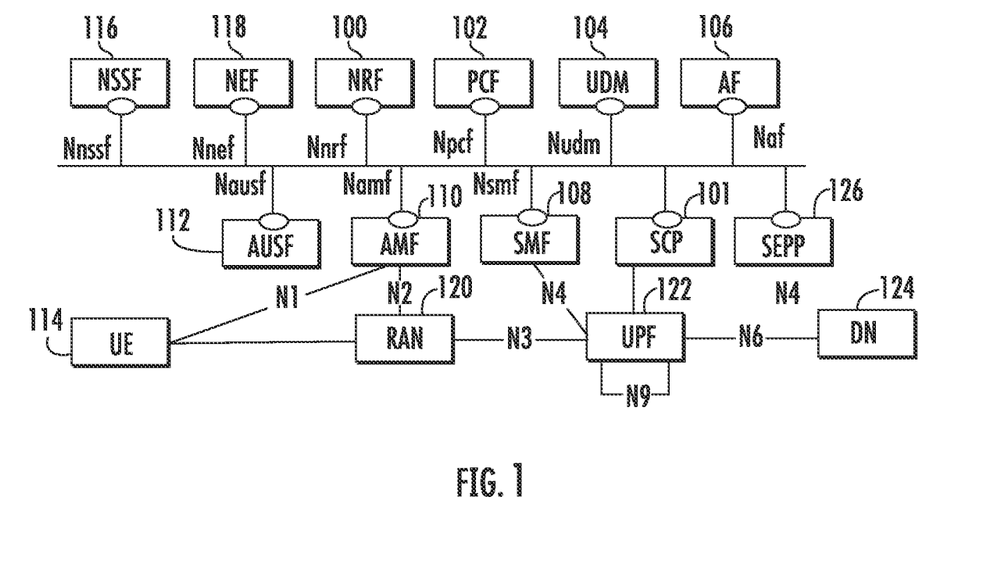
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem or shortcoming of existing 5G networks is the inability to efficiently generate NF set OCI and LCI for an NF set. Table 1 shown below illustrates the relationship between an NF instance, an NF set, and an NF service set.

TABLE 1

Relationships between NF Sets, NF Service Sets, and NF Instances

| Term | Definition |
| --- | --- |
| NF Instance | An identifiable instance of the NF. An NF Instance may provide services offered by one or more NF Service instances. |
| NF Service Instance | An identifiable instance of the NF service. |
| NF Service Set | A group of interchangeable NF service instances of the same service type within an NF instance. The NF service instances in the same NF service set have access to the same context data. |
| NF Set | A group of interchangeable NF instances of the same type, supporting the same services and the same network slice(s). The NF instances in the same NF set may be geographically distributed but have access to the same context data. |

The data in Table 1 comes from Section 3.1 of 3GPP TS 29.500. As indicated in Table 1, an NF set is a group of interchangeable NF instances of the same type capable of providing the same service. Because consumer NFs need to select an NF set that has sufficient capacity to provide a service requested by the consumer NFs, it is desirable to provide a method for efficiently determining and communicating NF set load and overload control information.

NF load control information is carried in the 3gpp-Sbi-Lci header of SBI response messages sent from a producer NF to a consumer NF and is used by the consumer NF to avoid selecting producer NFs that are heavily loaded. Overload control information is carried in the 3GPP-Sbi-Oci header in an SBI response message from a producer NF to a consumer NF to instruct the consumer NF to begin shedding load directed to the overloaded producer NF.

Section 6.4 of 3GPP TS 29.500 recommends overload control using the 3gpp-Sbi-Oci header. Overload control is a reactive mechanism to let the peer NF know to shed load when the producer NF is in an overloaded state. Section 5.2.3.2.9 explains the OCI header. For this document OLC-H (overload control based on header) is of interest. The scope of OCI can be NF-Instance, NF-Set, NF-Service-Instance and NF-Service-Set. The scope of NF-Set is of interest to the subject matter described herein.

Section 6.3 of 3GPP TS 29.500 recommends load control using the 3gpp-Sbi-Lci header. Load control is a proactive mechanism to avoid an overload condition. Section 5.2.3.2.10 further explains the LCI header. For this document, LC-H (Load Control based on Header) is of interest. The scope of OCI can be NF-Instance, NF-Set, NF-Service-Instance and NF-Service-Set. The scope of NF-Set is of interest to the subject matter described herein.

There is currently no mechanism (3GPP defined or other) available for NF set OCI and LCI calculation. 3GPP recommends that NFs use NF set OCI and LCI without explaining how to generate/calculate NF set OCI or LCI. OCI and LCI are piggy backed on SBI requests and responses, which use HTTP. There is no defined API to query NF set OCI or LCI from an NF. Peer NFs cannot query OCI and LCI information from other NFs.

Any NF-specific solution for calculating NF set OCI and LCI has the following problems. Performing the same NF set OCI and LCI calculation at multiple NFs is inefficient and performance intensive. NF set OCI and LCI calculated by different NFs may not be consistent. The addition of duplicate LCI and OCI headers by multiple NFs increases network traffic. A consumer-NF-centric solution may face inter-working issues if the NFs in the NF set are provided by different vendors.

According to the subject matter described herein, the SCP extracts individual NF LCI from the SBI messages. If a producer NF does not support LCI, the NF set LCI can be calculated by the SCP based on SBI message rate and a message handling capacity of the producer NF configured at the SCP. For example, the NF instance LCI can be calculated as the current message rate of the producer NF instance divided by the configured message handling capacity of the producer NF instance. The SCP calculates the NF Set LCI using the normalized NF capacity (obtained from the NF profiles of the producer NFs) and NF instance LCI of the producer NF instances in the NF set. The SCP calculates NF set OCI from the calculated NF set LCI. The SCP adds the NF set OCI and LCI to the appropriate SBI messages.

Figure 2:
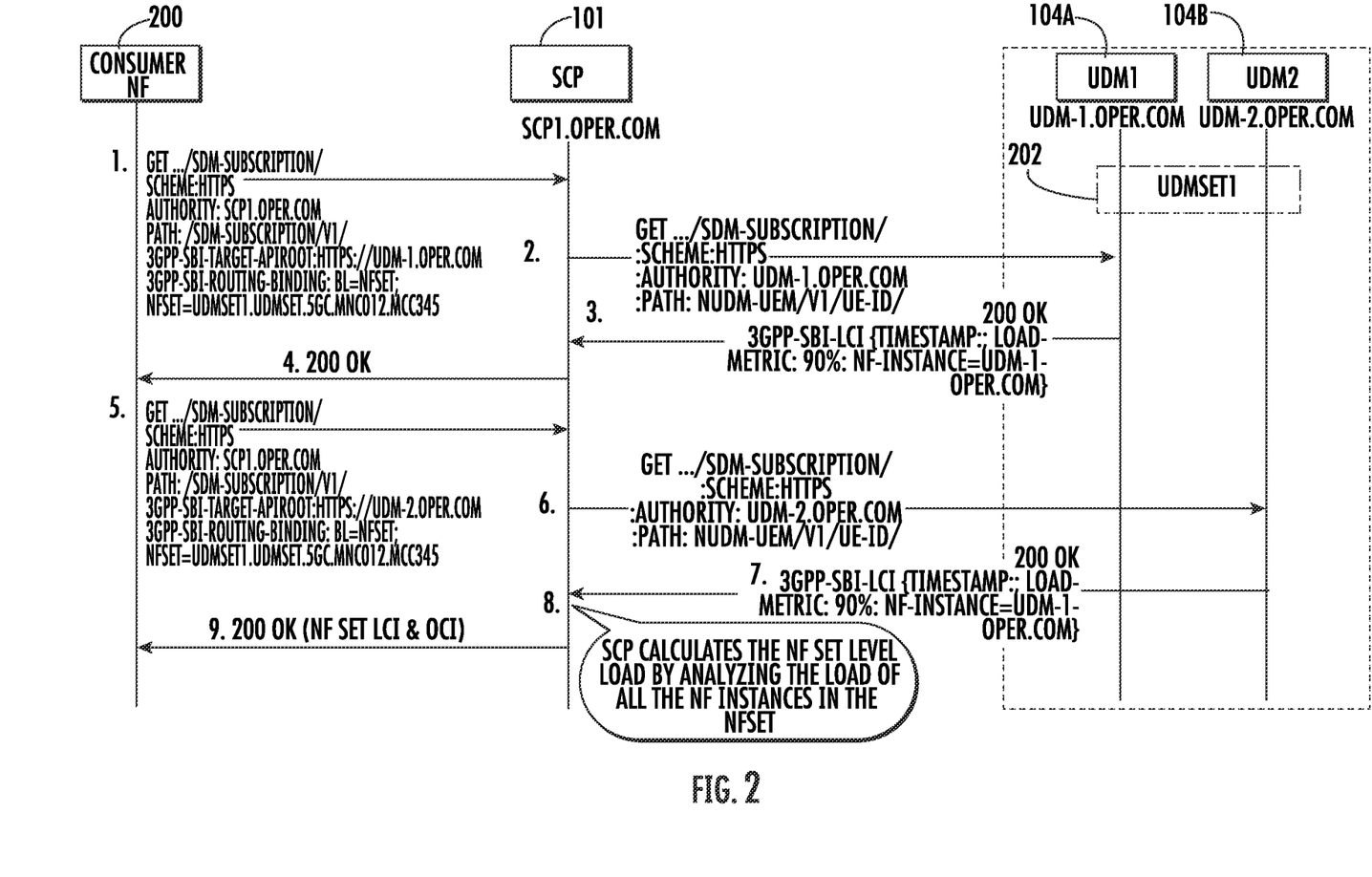
FIG. 2 is a message flow diagram illustrating exemplary messages exchanged for generating and using load control information at an SCP where the SCP generates NF set load control information for an NF set and communicates the NF set load control information for the NF set to a consumer NF.

FIG. 2 is a message flow diagram illustrating exemplary messages exchanged for NF set OCI and LCI generation and use at and SCP, where the SCP generates and communicates the OCI and LCI for an NF set to a consumer NF for use in producer NF set selection. Referring to FIG. 2, in step 1, a consumer NF 200 sends an SBI service request to SCP 101. The SBI service request is an HTTP GET message that is directed to a target resource of UDM1 104A, which is a member of UDM set1 202. UDM set1 202 also includes UDM2 104B. The HTTP GET message also identifies UDM set1 202 in the 3gpp-Sbi-Routing-Binding header. The 3gpp-Sbi-Routing-Binding header contains a routing binding indication use to direct a service request to an HTTP server which has the targeted NF service resource context. In the illustrated example, the 3gpp-Sbi-Routing-Binding header identifies the binding level as NF set and the target NF set as udmset1.udmset.5gc.mnc012.mcc345, which identifies UDM set1 202.

The HTTP GET message further includes a 3gpp-Sbi-Target-apiRoot header, which is set to the apiRoot of an authority server for the target resource, if available, in requests it sends to the SCP. In particular, for indirect communication without delegated discovery, a service request sent to the SCP to create a resource includes a 3gpp-Sbi-Target-apiRoot header set to the apiRoot of the selected NF service instance of the NF service producer, if the NF service consumer has selected a specific NF service producer instance. In the illustrated example, consumer NF 200 has selected UDM1 104A, and thus the 3GPP-Sbi-Target-apiRoot is set to https://udm1-oper.com, which identifies the server that hosts UDM1 104A. In step 2, SCP 101 sends the HTTP GET message to UDM1 104A in UDM set1 202.

In step 3, UDM1 104A sends a 200 OK message to SCP 101 in response to the HTTP GET message in step 2. The 200 OK message includes load control information for UDM1 104A. In the illustrated example, the load control information is carried in the 3gpp-Sbi-Lci header of the 200 OK message. The 3gpp-Sbi-Lci header is defined in Section 5.2.3.2.10 of 3GPP TS 29.500. According to the definition of the 3GPP-Sbi-Lci header, the parameters that are included in the header are load metric, which is an integer value ranging from 0 to 100 and represents the current loading on the producer NF as a percentage of total loading. In FIG. 2, the load metric is 90%, indicating that the producer NF is 90% loaded. Another mandatory parameter of the 3gpp-Sbi-Lci header is the timestamp, which indicates the timestamp when the load control information is being reported. The timestamp is represented symbolically in step 3 of FIG. 2 as "Timestamp". Another mandatory parameter of the 3gpp-Sbi-Lci header is the load control scope, which can be either a parameter that indicates nfProducerScope, if the load of a producer NF is being reported or scpScope, if the load of an SCP is being reported. If the load of a producer NF is being reported, the scope can be NF-Instance, if the load of an individual producer NF instance is being reported, NF-Set, if the load of an NF set is being reported, or NF-Service-Set, if the load of an NF service set is being reported. In step 3 of FIG. 2, the load of a producer NF is being reported, so the load control scope parameter is set to NF-Instance=udm-1-oper.com, which identifies that the load metric being reported is for UDM1 104A.

SCP 101 receives the 200 OK message with the load control information for UDM1 104A and, in step 4, sends a 200 OK message to consumer NF 200. The 200 OK message sent to consumer NF 200 may also include the load control information for UDM1 104A. However, the load control information is not illustrated in step 4.

In step 5, consumer NF 200 sends an SBI request message to SCP 101. The SBI request message is an HTTP GET message that identifies the 3gpp-Sbi-Target-apiRoot as https://udm-2.oper.com, which identifies UDM2 104B as the target resource. The SBI request message also identifies UDM set 1 202 as the NF set as part of the 3gpp-Sbi-Routing-Binding header.

In step 6, SCP 101 receives the SBI request message and generates and sends an SBI request message to UDM2 104B. UDM2 104B receives the SBI request message and, in step 7, formulates and sends a 200 OK message to SCP 101. The 200 OK message includes load control information for UDM2 104B. In the illustrated example, the load control information identifies the load metric for UDM2 104B as 90%, indicating that UDM2 104B is 90% loaded.

In step 8, SCP 101 receives the 200 OK message including the load control information for UDM2 104B and calculates load control information for the NF set by summing the load control information for all of the NF instances in the NF set. In one example, SCP 101 may calculate the load control information for the NF set by summing the normalized NF instance load control information of the individual producer NF instances. Equations 1 and 2 shown below illustrate an example calculation that may be performed by SCP 101 in generating LCI for an NF set.

$$\text{Load}(nf\text{ Set}) = \sum \text{Normalized Load of all } NF \text{ Instances in the } NF \text{ Set} \tag{1}$$

$$\text{Normalized Load of } NF_n = \frac{Load_n * Capacity_n}{\sum \text{Capacities of all } NF \text{ instances in the } NF \text{ set}} \tag{2}$$

where load(nfSet) is the calculated load of the NF set, $NF_n$ is the $n^{th}$ NF instance whose normalized load is being calculated, n is an integer, $Load_n$ is a computed or reported load of $NF_n$ and $Capacity_n$ is a processing capacity of $NF_n$.

As described above, if a producer NF instance that is a member of an NF set does not report load control information, SCP 101 may compute load control information from the published capacity of the producer NF that is obtained from the NF profile of the producer NF returned in an NF discovery response from the NRF and a message rate of the producer NF. For example, if the published capacity is 10000 messages per minute and the producer NF instance is currently handling 5000 messages per minute, the LCI for the producer NF instance may be calculated to be 50%.

In addition to computing load control information for a producer NF set, SCP 101 may also compute an overload reduction metric for the producer NF set. The overload reduction metric is defined in section 5.2.3.2.9 of 3GPP TS 29.500 as a mandatory parameter in the 3gpp-Sbi-Oci header. According to Section 5.2.3.2.9, the overload reduction metric is up to 3 digits and has a length between zero and 100. The overload reduction metric is defined in Section 6.4.3.4.3 of 3GPP TS 29.500 and indicates the percentage of traffic reduction that the OCI sender requests the receiver to apply. For example, an overload reduction metric value of 0 indicates that the sender is not overloaded, and a value of 10 indicates that the sender is requesting that the OCI receiver reduce traffic to the OCI sender by 10%. The 3gpp-Sbi-Oci header also includes an OCI scope parameter which may be set to NF instance, NF set, NF service instance, or NF service set. The scope of NF set may be used by SCP 101 to communicate NF set OCI information to consumer NFs.

In one exemplary implementation, SCP 101 may store, in memory, an NF set overload reduction metric database including a plurality of NF set load threshold values and corresponding overload reduction metric values. SCP 101 may perform a lookup in the database using the NF set OCI to locate a highest NF set load threshold value exceeded by the NF set LCI. SCP 101 may read, from the NF set overload reduction metric database, an overload reduction metric corresponding to the highest NF set load threshold value exceeded by the NF set LCI.

Table 2 shown below illustrates an example of attributes that can be used to generate NF set OCI for communication to other network nodes or for use by the SCP.

TABLE 2

Attributes for Generation of NF Set OCI at SCP

| Attribute | Description |
|---|---|
| NF Set Load Threshold | Minimum NF set load value for setting the specified NF set overload reduction metric |
| Overload Reduction Metric | Overload Reduction Metric Value |

In Table 2 the attributes for generating NF set OCI at the SCP include an NF set load threshold, which is an operator-configured value that specifies a load threshold for which a corresponding overload reduction metric is to be applied. Table 3 shown below illustrates examples of NF set load thresholds and corresponding overload reduction metrics that may be configured in the SCP by the network operator.

TABLE 3

Example NF Set Load Threshold and Overload Reduction Metric Values

| NF Set Load Threshold | Minimum NF set load value for setting the specified NF set overload reduction metric |
|---|---|
| 90 | 20 |
| 80 | 10 |
| 70 | 5 |

Using the values in Table 3, SCP 101 can generate NF set OCI information that is usable to shed load from an overloaded NF set. For example, if SCP 101 determines that the load on a producer NF set is 90% or above, SCP 101 may generate a value of 20, which indicates to the receiving consumer NF that it should reduce its load on the NF set by 20%. Similarly, if the current load on the NF set is calculated to be above 80% but less than 90%, SCP 101 may determine that the overload reduction metric is 10, which indicates that the load on the NF set should be reduced by 10%. The final row in Table 3 indicates that if the computed load of the NF set is higher than 70% but less than 80%, the overload reduction metric is 5, indicating that the load on the NF set should be reduced by 5%.

Returning to the message flow in FIG. 2, in step 7, SCP 101 communicates the NF OCI and/or LCI to consumer NF 200 using OCI and/or LCI headers appended to the 200 OK message. Consumer NF 200 may utilize the NF set OCI and/or LCI to select an NF set for subsequent messages and/or to reduce load on the current NF set identified in the OCI and/or LCI headers.

Figure 3:
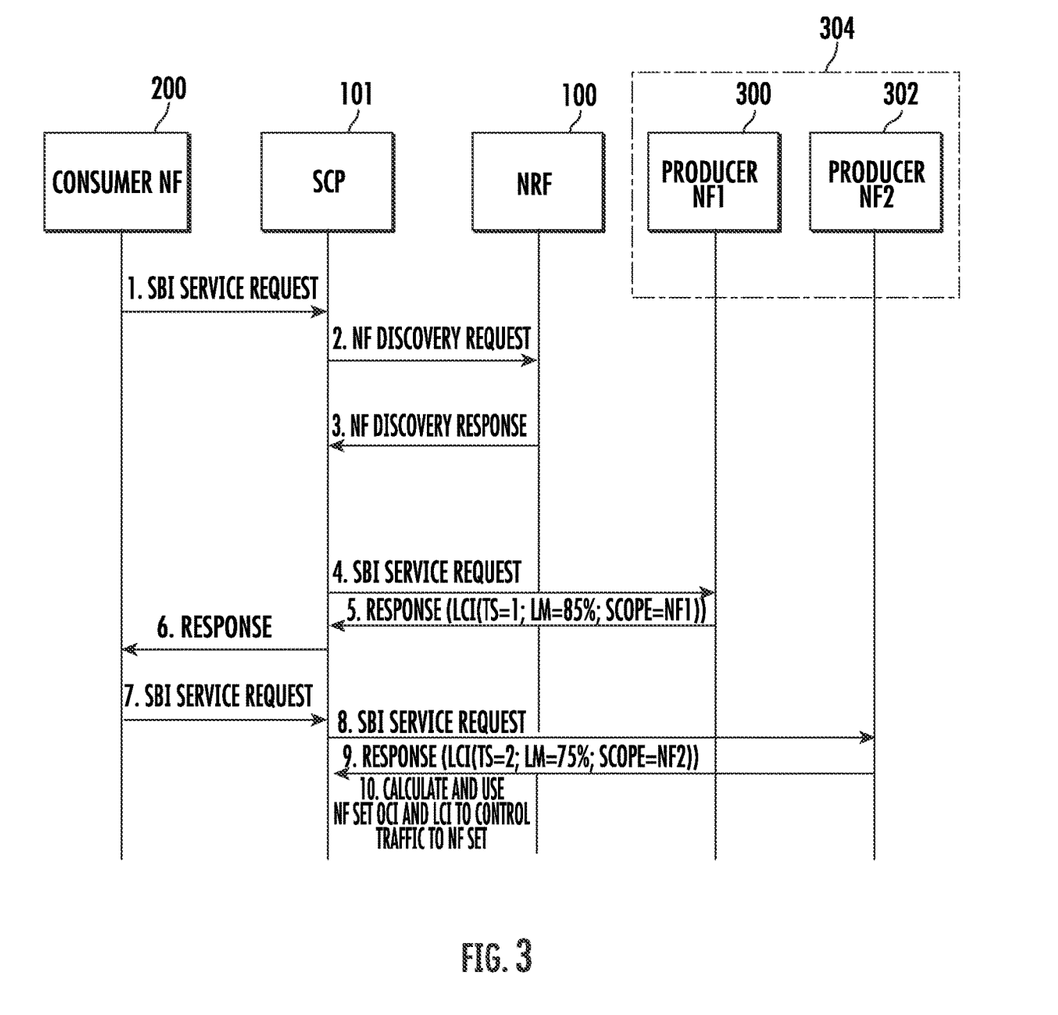
FIG. 3 is a message flow diagram illustrating exemplary messages exchanged for generating and using load control information and overload control information for an NF set at an SCP where the SCP generates and uses the NF set load control information to perform producer NF selection.

In the example illustrated in FIG. 2, the SCP computes OCI and LCI information for an NF set an communicates the information to a consumer NF. In an alternate example, SCP 101 may compute the OCI and LCI for the NF set and use the LCI to perform producer NF set selection and the OCI to reduce load on the NF set. FIG. 3 illustrates this case. In FIG. 3, SCP 101 performs delegated discovery and NF selection on behalf of consumer NF 200. Producer NFs 300 and 302 form an NF set 304.

Referring to the message flow illustrated in FIG. 3, in step 1, consumer NF 200 sends an SBI service request to SCP 101. The SBI service request includes query parameters that assist SCP 101 in generating an NF discovery request to discover NF profiles capable of providing the service requested by consumer NF 200.

In step 2 of the message flow diagram, SCP 101 sends an NF discovery request message to NRF 100. The NF discovery request message includes the query parameters obtained from the service request in step 1 to identify the service. NRF 100 receives the NF discovery request, reads the query parameters in the request, and uses the query parameters to extract, from the NF profiles database, NF profiles of producer NFs capable of providing the service requested in the service request.

In step 3, NRF 100 returns and NF discovery response to SCP 101. The NF discovery response includes an array of NF profiles of producer NFs capable of providing the requested service. An NF profile is a data structure defined in 3GPP TS 29.510 that includes connectivity and service information of producer NFs.

SCP 101 receives the NF profiles and selects one of the producer NFs to provide the service requested in the service request. In this example, it is assumed that SCP 101 selects NF1 300 to provide the service and sends an SBI service request in step 4 to producer NF1 300. In step 5 of the message flow diagram, producer NF 302 sends a response message to SCP 101. The response message includes load control information for producer NF1 300. In the illustrated example, the load control information includes a timestamp of 1, a load metric of 85%, and a scope of NF1, indicating that the load metric is for NF1 300. In step 6, SCP 101 sends an SBI service response to consumer NF 200.

In step 7 of the message flow diagram, consumer NF 200 sends another SBI service request to SCP 101. In step 8, SCP 101 again performs producer NF selection using the query parameters in the service request and this time selects producer NF2 302. In step 8, SCP 101 forwards the SBI service request to producer NF2 302. Producer NF2 302 receives the SBI service request and responds in step 9 with an SBI service response message. The SBI service response message includes load control information including a timestamp of 2, a load metric of 75%, and a scope of NF2, indicating that the load metric is for NF2 302.

In step 10 of the message flow diagram, SCP 101 calculates and uses the NF set OCI and LCI information to control traffic to the NF set. The NF set load control information may be calculated using Equations 1 and 2 above as follows:

Normalized Load of $NF_1 =$ $$\frac{Load_1 * Capacity_1}{\sum Capacity1, Capacity2} = \frac{(85\%)*(10,000)}{10000 + 10000} = \frac{(8500)}{20,000} = 42.5\%$$

Normalized Load of $NF_2 =$ $$\frac{Load_2 * Capacity_2}{\sum Capacity1, Capacity2} = \frac{(75\%)*(10,000)}{10000 + 10000} = \frac{(7500)}{20,000} = 37.5\%$$

Load of $NF$ Set $=$ $$\sum \text{Normalized Load of } NF \text{ Instances} = \sum \text{Load } NF1,$$

$$\text{Load } NF2 = 42.5 + 37.5\% = 80\%$$

From Table 3, the overload reduction metric for an NF set load of 80% would be 10%. SCP 101 may use the NF set OCI and LCI values to perform subsequent NF set selection and overload control. Alternatively, SCP 101 may communicate the NF set OCI and LCI to consumer NFs by adding 3gpp-Sbi-Oci and 3gpp-Sbi-Lci headers including the NF set OCI and LCI to response messages being sent to the consumer NFs.

Figure 4:
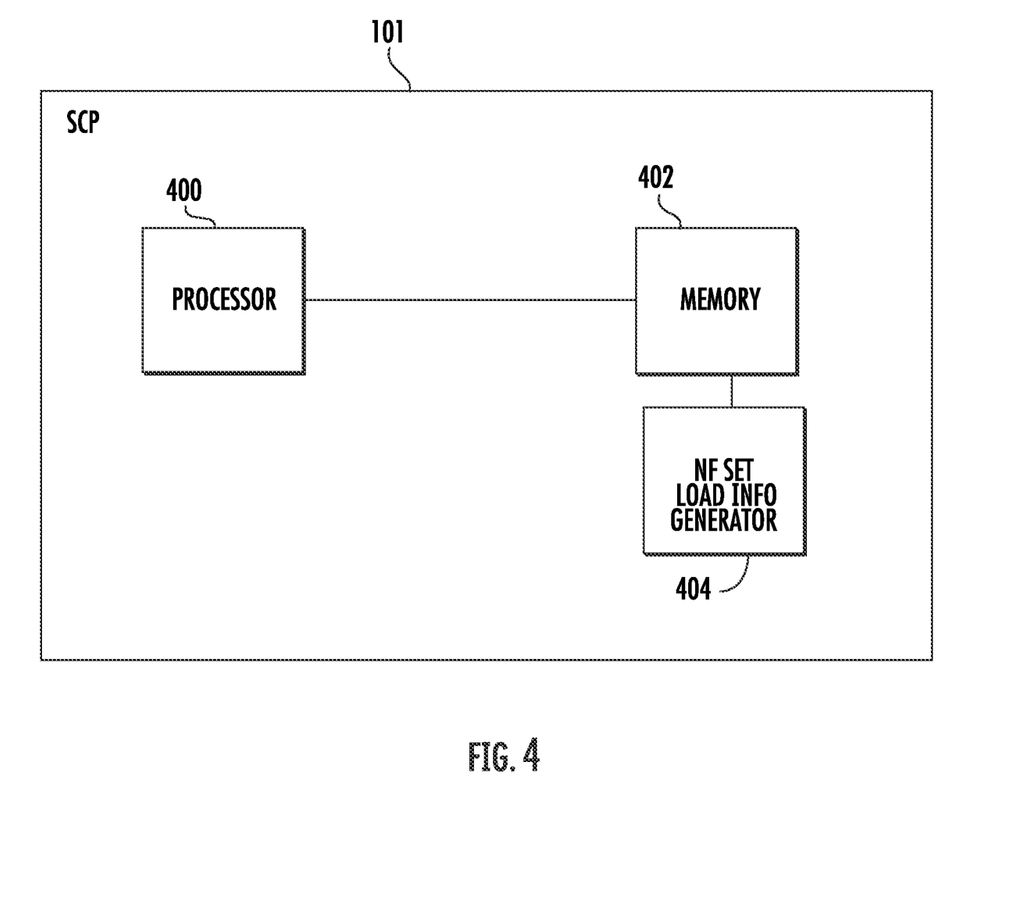
FIG. 4 is a block diagram illustrating an exemplary architecture for an SCP for generating and using NF set load control and overload control information.

FIG. 4 is a block diagram illustrating an exemplary architecture for SCP 101 that is capable of generating NF set OCI and LCI information and using the information or communicating the information to consumer NFs. Referring to FIG. 4, SCP 101 includes at least one processor 400 and a memory 402. SCP 101 further includes an NF set load information generator 404 for generating NF set OCI and LCI information from NF instance LCI information gathered from individual NF instances as described above. NF set load information generator 404 may either communicate the NF set OCI and LCI information to consumer NFs or use the NF set OCI and LCI to perform overload control and producer NF selection on behalf of consumer NFs. NF set load information generator 404 may be implemented using computer executable instructions stored in memory 402 and executable by processor 400.

Figure 5:
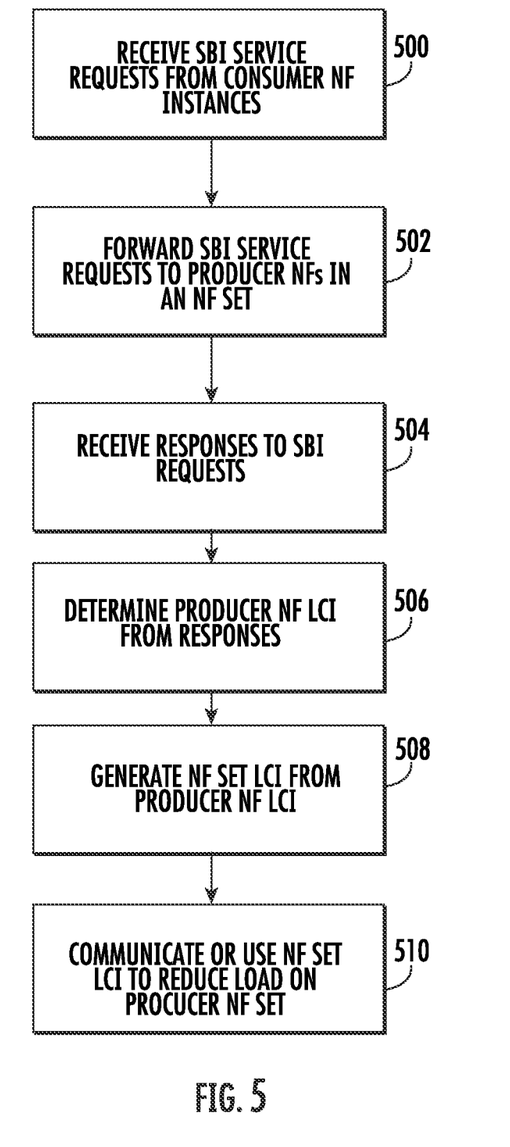
FIG. 5 is a flow chart illustrating an exemplary process for generating and using NF set load control information and overload control information at an SCP.

FIG. 5 is a flow chart illustrating an exemplary process for generating and using NF set OCI and LCI information at an SCP. Referring to FIG. 5, in step 500, the process includes receiving service based interface (SBI) service requests from consumer NFs. For example SCP 101 may receive SBI service requests from consumer NFs seeking to access network services.

In step 502, the process includes forwarding the SBI service requests to producer NF instances that are members of an NF set. For example, SCP 101 may either route the SBI service requests to the producer NFs identified in the SBI requests in the case where the consumer NFs perform producer NF selection or select producer NFs and forward SBI service requests to the selected producer NFs in the case where SCP 101 performs producer NF selection.

In step 504, the process includes receiving responses to the SBI service requests from the producer NF instances. For example, SCP 101 may receive responses from producer NF instances to which SCP 101 routed or forwarded SBI requests.

In step 506, the process includes determining producer NF instance LCI from the responses. For example, SCP 101 may extract producer NF instance LCI from the 3gpp-Sbi-Lci headers of the SBI response messages. Alternatively, SCP 101 may compute LCI for at least some of the producer NF instances using message rates of the producer NF instances and message handling capacities of the producer NF instances configured at the SCP.

In step 508, the process includes generating, by the SCP and from the producer NF instance LCI, LCI for the NF set. For example, SCP 101 may compute NF set LCI from the NF instance LCI for the members of the NF set using Equations 1 and 2 above.

In step 510, the process includes communicating or using the LCI for the NF set to reduce load on the producer NF set. For example, SCP 101 may either forward the NF set LCI to consumer NFs to allow the consumer NFs to use the NF set LCI to perform producer NF selection or use the NF set LCI to select producer NFs in the case where SCP 101 performs producer NF selection on behalf of consumer NFs. In either case, the producer NF set LCI is used to reduce load on the producer NF set.

The subject matter described herein achieves at least the following advantages:

Reduces network complexity and improves performance by offloading, from individual consumer NFs, the processing required for calculating NF set OCI and LCI.

Provides a consistent view of NF set OCI and LCI as it is generated by the SCP instead of being generated by individual producer NFs in an NF set.

Reduces network traffic by eliminating the transmission of duplicate NF set OCI and LCI among members of an NF set.

Provides NF set OCI and LCI even in the case where the producer NF for which NF set OCI and LCI is being calculated does not support OCI and LCI generation.

The disclosure of each of the following references is hereby incorporated herein by reference in its entirety.

REFERENCES

1. $3^{rd}$ Generation Partnership Project; Technical Specification Group Core Network and Terminals; 5G System; Technical Realization of Service Based Architecture; Stage 3 (Release 17) 3GPP TS 29.500 V17.2.0 (2021 March).
2. $3^{rd}$ Generation Partnership Project; Technical Specification Group Services and System Aspects; System architecture for the 5G System (5GS); Stage 2 (Release 17) 3GPP TS 23.501 V17.0.0 (2021 March).
3. $3^{rd}$ Generation Partnership Project; Technical Specification Group Core Network and Terminals; 5G System; Network Function Repository Services; Stage 3 (Release 17) 3GPP TS 29.510 V17.1.0 (2021 March).
4. $3^{rd}$ Generation Partnership Project; Technical Specification Group Services and System Aspects; Procedures for the 5G System (5GS); Stage 2 (Release 17) 3GPP TS 23.502 V17.0.0 (2021 March).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating and using network function (NF) set load information, the method comprising:
at a service communication proxy (SCP):
   receiving service based interface (SBI) requests from consumer NFs;
   forwarding the SBI requests to producer NF instances that are members of an NF set;
   receiving responses to the SBI requests from the producer NF instances;
   determining NF instance load control information (LCI) for the producer NF instances from the responses;
   computing, by the SCP and from the NF instance LCI for the producer NF instances, NF set LCI for the NF set, wherein computing the NF set LCI includes generating a sum using the NF instance LCI determined for the producer NF instances and wherein generating the sum includes adding normalized loads of the producer NF instances in the NF set using the following expression:

$$\text{Load}(\text{nfSet}) = \Sigma \text{Normalized Loads of all } NF \text{ Instances in } NF \text{ Set,}$$

where Load(nfSet) is the NF set LCI for the NF set and ΣNormalized Loads of all NF Instances in NF set is a sum of normalized loads of all of the producer NF instances in the NF set; and
   communicating the NF set LCI to at least one of the consumer NFs or using the NF set LCI to select a producer NF instance within an NF set to provide a service for one of the consumer NFs.

2. The method of claim 1 wherein determining NF instance LCI for the producer NF instances includes reading NF instance LCI values from 3gpp-Sbi-Lci headers of the responses.

3. The method of claim 1 wherein determining NF instance LCI for the producer NF instances includes computing NF instance LCI for at least some of the producer NF instances from message rates of the producer NF instances and message handling capacities of the producer NF instances configured at the SCP.

4. The method of claim 1 comprising computing the normalized loads of the producer NF instances using the following expression:

$$\text{Normalized Load of } NF_n = \frac{Load_n * Capacity_n}{\sum \text{Capacities of all } NF \text{ instances in the } NF \text{ set}}$$

where $NF_n$ is the nth producer NF instance whose normalized load is being calculated, n being an integer, $Load_n$ is the NF instance LCI determined for producer NF instance $NF_n$ and $Capacity_n$ is a processing capacity of the producer NF instance $NF_n$ obtained from an NF profile of the producer NF instance $NF_n$.

5. The method of claim 1 comprising determining, by the SCP, an NF set overload reduction metric using the LCI for the NF set.

6. The method of claim 5 wherein determining the NF set overload reduction metric includes:
   storing, in memory of the SCP, an NF set overload reduction metric database including a plurality of NF set load threshold values and corresponding overload reduction metric values;
   performing a lookup in the NF set overload reduction metric database using the NF set LCI for the NF set to locate a highest NF set load threshold value exceeded by the NF set LCI for the NF set; and
   reading, from the NF set overload reduction metric database, an NF set overload reduction metric corresponding to the highest NF set load threshold value exceeded by NF set LCI for the NF set.

7. The method of claim 5 comprising communicating the NF set overload reduction metric to at least one of the consumer NFs.

8. The method of claim 5 comprising, using, by the SCP, the NF set overload reduction metric to reduce load on the NF set.

9. A system for generating and using network function (NF) set load information, the system comprising:
   a service communication proxy (SCP) including at least one processor for receiving service based interface (SBI) requests from consumer NFs and forwarding the SBI requests to producer NF instances that are members of an NF set; and
   an NF set load information generator implemented by the at least one processor for receiving responses to the SBI requests from the producer NF instances, determining NF instance load control information (LCI) for the producer NF instances using the responses, computing, from the NF instance LCI for the producer NF instances, NF set LCI for the NF set; and communicating the NF set LCI for the NF set to at least one of the consumer NFs or using the NF set LCI for the NF set to select a producer NF instance within an NF set to provide a service for one of the consumer NFs, wherein the NF set load information generator is configured to compute the NF set LCI for the NF set by generating a sum using the NF instance LCI determined for the producer NF instances and wherein the NF set load information generator is configured to generate the sum by adding normalized loads of the producer NF instances in the NF set using the following expression:

$$\text{Load(nfSet)} = \Sigma \text{Normalized Loads of all } NF \text{ Instances in } NF \text{ Set},$$

where Load(nfSet) is the NF set LCI for the NF set and ΣNormalized Loads of all NF Instances in NF Set is a sum of normalized loads of all of the producer NF instances in the NF set.

10. The system of claim 9 wherein the NF set load information generator is configured to determine the NF instance LCI for the producer NF instances by reading NF instance LCI values from 3gpp-Sbi-Lci headers of the responses.

11. The system of claim 9 wherein the NF set load information generator is configured to determine the NF instance LCI for the producer NF instances by computing the NF instance LCI for at least some of the producer NF instances from message rates of the producer NF instances and message handling capacities of the producer NF instances configured at the SCP.

12. The system of claim 9 wherein the NF set load information generator is configured to compute the normalized loads of the producer NF instances using the following expression:

$$\text{Normalized Load of } NF_n = \frac{Load_n * Capacity_n}{\sum \text{Capacities of all } NF \text{ instances in the } NF \text{ set}}$$

where $NF_n$ is the producer nth NF instance whose normalized load is being calculated, n being an integer, $Load_n$ is the NF instance LCI of producer NF instance $NF_n$ and $Capacity_n$ is a processing capacity of the producer NF instance $NF_n$ obtained from an NF profile of the producer NF instance $NF_n$.

13. The system of claim 9 wherein the NF set load information generator is configured to determine an NF set overload reduction metric based on the NF set LCI.

14. The system of claim 13 wherein the NF set load information generator is configured to determine the NF set overload reduction metric by:
   storing, in memory of the SCP, an NF set overload reduction metric database including a plurality of NF set load threshold values and corresponding overload reduction metric values;
   performing a lookup in the NF set overload reduction metric database using the NF set LCI for the NF set to locate a highest NF set load threshold value exceeded by the LCI for the NF set; and
   reading, from the NF set overload reduction metric database, an overload reduction metric corresponding to the highest NF set load threshold value exceeded by the NF set LCI for the NF set.

15. The system of claim 13 wherein the NF set load information generator is configured to communicate the NF set overload reduction metric to at least one of the consumer NFs or use the NF set overload reduction metric to reduce load on the NF set.

16. A non-transitory computer readable medium having stored thereon executable instructions that when executed by a processor of a computer control the computer to perform steps comprising:

at a service communication proxy (SCP):
  receiving service based interface (SBI) requests from consumer network functions (NFs);
  forwarding the SBI requests to producer NF instances that are members of an NF set;
  receiving responses to the SBI requests from the producer NF instances;
  determining NF instance load control information (LCI) for the producer NF instances using the responses;
  computing, by the SCP and from the NF instance LCI for the producer NF instances, NF set LCI for the NF set, wherein computing the NF set LCI includes generating a sum using the NF instance LCI determined for the producer NF instances and wherein generating the sum includes adding normalized loads of the producer NF instances in the NF set using the following expression:

$$\text{Load(nfSet)} = \Sigma \text{Normalized Loads of all } NF \text{ Instances in } NF \text{ Set,}$$

where Load(nfSet) is the NF set LCI for the NF set and ΣNormalized Loads of all NF Instances in NF set is a sum of normalized loads of all of the producer NF instances in the NF set; and
  communicating the NF set LCI for the NF set to at least one of the consumer NFs or using the NF set LCI for the NF set to select a producer NF instance within an NF set to provide a service for one of the consumer NFs.

* * * * *

UNITED STATES PATENT AND TRADEMARK OFFICE
CERTIFICATE OF CORRECTION

| | | |
|---|---|---|
| PATENT NO. | : 11,671,369 B2 | |
| APPLICATION NO. | : 17/376095 | |
| DATED | : June 6, 2023 | |
| INVENTOR(S) | : Rajput et al. | |

It is certified that error appears in the above-identified patent and that said Letters Patent is hereby corrected as shown below:

In the Drawings

On sheet 5 of 5, in FIG. 5, under Reference Numeral 510, Line 3, delete "PROCUCER" and insert -- PRODUCER --, therefor.

In the Specification

In Column 2, Line 3, delete "thein direct" and insert -- the indirect --, therefor.

In Column 7, Line 33, delete "lnstances" and insert -- Instances --, therefor.

Signed and Sealed this
Thirtieth Day of April, 2024

Katherine Kelly Vidal
*Director of the United States Patent and Trademark Office*